US012800835B2

(12) United States Patent
Jia et al.

(10) Patent No.: US 12,800,835 B2
(45) Date of Patent: Nov. 17, 2026

(54) OPTICAL FIBER ARRAY COLLIMATOR APPLIED TO MULTI-LINE LiDAR

(71) Applicant: II-VI Delaware, Inc., Wilmington, DE (US)

(72) Inventors: Xu Jia, Fuzhou City (CN); Lingdong Bao, Fuzhou City (CN); Lei Lin, Fuzhou City (CN); Guanglong Yu, Fuzhou City (CN)

(73) Assignee: II-VI Delaware, Inc., Wilmington, DE (US)

( * ) Notice: Subject to any disclaimer, the term of this patent is extended or adjusted under 35 U.S.C. 154(b) by 900 days.

(21) Appl. No.: 18/149,335

(22) Filed: Jan. 3, 2023

(65) Prior Publication Data

US 2023/0228942 A1 Jul. 20, 2023

(30) Foreign Application Priority Data

Jan. 20, 2022 (CN) ......................... 202210066029.4

(51) Int. Cl.
*G02B 6/26* (2006.01)

(52) U.S. Cl.
CPC .................................... *G02B 6/262* (2013.01)

(58) Field of Classification Search
CPC .......... G02B 6/262; G02B 6/04; G02B 6/322; G02B 6/3624; G02B 6/3839; G02B 6/4206; G02B 27/30; G02B 6/32; G02B 6/4287; G02B 6/4296; G01S 7/4815
USPC .......................................................... 359/642
See application file for complete search history.

(56) References Cited

U.S. PATENT DOCUMENTS

| | | | | |
|---|---|---|---|---|
| 5,519,799 A * | 5/1996 | Murakami | G02B 6/3825 | 385/84 |
| 2002/0131699 A1* | 9/2002 | Raguin | G02B 6/322 | 385/33 |
| 2003/0063852 A1* | 4/2003 | Schiffer | G02B 6/32 | 385/33 |
| 2004/0081396 A1* | 4/2004 | Komine | G02B 6/4204 | 385/33 |
| 2017/0353005 A1* | 12/2017 | Filgas | H01S 5/0235 | |
| 2020/0350737 A1* | 11/2020 | Beresnev | H01S 3/2383 | |
| 2023/0375404 A1* | 11/2023 | Bendick | G01N 15/1434 | |

* cited by examiner

*Primary Examiner* — Mohammed A Hasan
(74) *Attorney, Agent, or Firm* — TraskBritt

(57) ABSTRACT

A collimator assembly for producing a plurality of laser beams including a housing, an optical fiber array, a connector, and a collimating lens component. The optical fibers are configured to emit the laser beams from ends thereof. A connector is disposed in an input of the housing and configured to arrange the fiber ends. The connector has an end face disposed at an acute angle relative to the fiber ends. The collimating lens component is disposed in an output of the housing and has a focal plane near an output surface of the laser beams from the optical fiber array. Such a collimator assembly may be used in a Light Detection and Ranging (LiDAR system).

27 Claims, 5 Drawing Sheets

OPTICAL FIBER ARRAY COLLIMATOR APPLIED TO MULTI-LINE LiDAR

CROSS-REFERENCE TO RELATED APPLICATIONS

The present application claims priority to Chinese Patent Application No. 202210066029.4 filed Jan. 20, 2022. The aforementioned application is hereby incorporated by reference in its entirety.

TECHNICAL FIELD

The present disclosure relates to the field of laser and Light Detection and Ranging (LiDAR), particularly to an optical fiber array collimator for multi-line LiDAR.

BACKGROUND

LiDAR, short for Light Detection and Ranging, is a radar system that fires laser beams to detect characteristics, such as a target's position and speed. LiDAR's working principle involves sending an emission signal (laser) to the target, and then receiving the reflected signal from the target (target echo), which is compared with the emission signal. After proper treatment, target information can be obtained, including the target distance, azimuth, altitude, speed, attitude, and even shape parameters, for target detection, tracking, and recognition.

LiDAR uses a laser transmitter, an optical receiver, a turntable, and an information processing system. There are two types of LiDAR systems, including single-line LiDAR and multi-line LiDAR. Single-line LiDAR has an emitting light source, which can obtain spatial information in a plane through optical scanning or other scanning methods. Multi-line LiDAR has multiple emitting light sources that are arranged in a vertical direction. Multi-line LiDAR can also obtain three-dimensional information of a target space through optical machine scanning or other scanning methods.

In terms of applications, single-line LiDAR can only scan in a plane and cannot measure the height of objects. At present, single-line LiDAR is mainly applied to service robots, such as sweeping robots, food delivery robots, and robots in hotels. Multi-line LiDAR can recognize the height information of objects and can obtain 3D scanning images of the surrounding environment. Multi-line LiDAR is mainly used in the field of unmanned driving to achieve 3D modeling, environment perception, simultaneous positioning mapping (SLAM), and so on. For multi-line LiDAR, the more laser beams that are emitted, the more spatial information can be acquired, and the higher spatial resolution can be achieved.

At present, multi-line LiDAR uses multiple laser transmitters. Each laser transmitter mainly includes a laser light source and a collimation system, and each laser transmitter corresponds to a scan line number and is able to measure a distance. Due to the high cost of laser transmitters, the cost of multi-line LiDAR transmitters increases linearly as the number of scan lines increases, and the control, crosstalk, arrangement, and packaging of each laser transmitter becomes more complex and larger with the increase in the number of scan lines. Therefore, with the current technology, as the number of LiDAR lines increases to a certain number, increasing the number of laser transmitters to improve the number of LiDAR scan lines will only make the assembly more difficult to manufacture, larger, and more expensive.

FIGS. 1A-1B shows a multi-line LiDAR system 10, such as available from Velodyne in the United States. The multi-line LiDAR system 10 includes a housing 16 that can rotate with a motor 14 mounted to a base 12. A face 18 of the housing 16 has laser receiver units 20 and laser transmitter units 30. Two groups of the laser receiver units 20 are shown here, and each has multiple (e.g., 32) receivers (not shown) along with optics and other components. Multiple groups of the laser transmitter units 30 are also used, and each unit 30 can have multiple (e.g., 8) transmitters or emitters (not shown) along with optics and other components.

As shown in the side view of FIG. 1B with portion of the housing removed, the multiple laser transmitters 32 are arranged vertically in groups of vertical arrays 34 to produce a huge volume and a vertical field angle of view of 28.6 degrees. At present, multi-line LiDAR can achieve up to 128 lines, but the price can be very expensive. For example, a 64-line LiDAR often costs up to tens of thousands of dollars. The general car enterprises and consumers cannot afford such a high price. In addition, due to the difficulty of assembly, the multi-line LiDAR also faces great challenges in mass production.

In recent years, with the rapid development of the Internet, cloud computing, 5G communications, artificial intelligence and other high-tech, unmanned driving technology is becoming increasingly mature, and large-scale commercialization is within reach, the industry is expected to achieve in the next 5 to 10 years. As one of the core components of unmanned driving technology, vehicle-mounted LiDAR has a promising future. Its market capacity is very large, and the annual demand will be up to tens of millions of sets. Developers are attempting to break through the existing technical obstacles to realize large-scale production of low-cost, miniaturized, high-performance, and highly reliable vehicle-mounted LiDAR.

The subject matter of the present disclosure is directed to overcoming, or at least reducing the effects of, one or more of the problems set forth above.

SUMMARY OF THE DISCLOSURE

To solve the problems existing in the prior art, the disclosure is directed to an optical fiber array collimator, which can be used for a multi-line LiDAR system.

The optical fiber array collimator includes an optical fiber array component, a collimating lens component, and a housing. The light output surface of the optical fiber array assembly is installed near a focal plane of the collimating lens assembly. By adjusting the distance between the optical fiber array and the collimating lens, high-precision collimated beams can be realized simultaneously from multiple optical fibers. After adjusting the performance parameters of the collimator, the optical fiber array component and the lens component are fixed in the housing to complete the assembly of the optical fiber array collimator.

The optical fiber array can include an end connector having a base component, optical fibers, and an upper cover plate. The material of the base component is usually glass, Si, ceramic, etc., and V-grooves in the base component can be processed by a high-speed blade dicing of a slicing machine or etching process. The pitch accuracy of the V-grooves can be as high as 0.5 micron, and the V-groove spacing can be unevenly or evenly distributed according to the design requirements. The optical fibers for the fiber array can be single-mode or multi-mode optical fibers, and the number of optical fiber can be greater than two and up to hundreds. The cover plate material can be glass or ceramic. During assembly, the optical fiber is placed in the V-grooves, and the upper cover is pressed on the optical fibers and is fixed. The middle area is filled with high reliability glue. After the glue is cured, the end face of the end connector for the optical fiber array is ground and polished.

Preferably, in the assembly of the optical fiber array, the spacing between each fiber channel can have an uneven density distribution or can have a uniform distribution according to the design requirements. For example, the distance between the optical fiber cores can range from 0.2 mm to dozens of millimeters, and spacing accuracy can be up to 0.75 micron or less.

Preferably, in the assembly, the optical fiber array can be processed with an angle between the polished end face and the back surface. Stated differently, the end face is angled and is not just orthogonal to the axis of the fibers in the end connector. In particular, the end face can be set at an offset angle from orthogonal. Consequently, the fiber ends are defined at an angle $\alpha$ relative to the normal of the end face. The angle can range from 4 degrees to 20 degrees. This can greatly improve the RL (Return Loss) specifications of the collimator and can reduce the interference of the return light to the laser.

Preferably, in the assembly of the optical fiber array, the polished face can be coated with anti-reflection film having a wavelength range of 800 nm to 1600 nm to cover the LiDAR light source emission wavelength and to reduce the reflection loss of the optical fiber end.

Preferably, the input ends of the optical fibers in the array can have standard connectors, including but not limited to LC, SC, FC, ST, and other industry standard connectors.

Preferably, the optical fiber array can superimpose L components of 1×N optical fiber arrays to form a two-dimensional optical fiber array of L×N.

Preferably, the optical fiber array can also be an integrated L×N two-dimensional fiber array assembly. Using a lithography process, a series of optical fiber through-holes with sub-micron size and spacing can be processed on a glass plate or Si plate according to the design requirement. The optical fibers are fixed in the holes with high reliability glue. After grinding and polishing the end face of the optical fibers, the end surface can be coated with anti-reflection film having a wavelength range of 800 nm to 1600 nm, covering the emission wavelength of the LiDAR light source so as to reduce the reflection loss of fiber end face.

Preferably, the optical fiber array as stated can have N ports or M×N ports at an input end of optical fibers, which can be connected with an optical fiber coupler or fiber splitter having 1×N or M×N (among them, the M and N are integers) ports of the output end. Using the optical fiber coupler or splitter, one or M high power laser transmission power can be divided into 1/N, with a total output of N or M×N collimating beams, which will greatly reduce the number of lasers.

Further, the 1×N fiber coupler, having one fiber input end and N fiber output end, can cascade through a number of fiber couplers or fiber splitters to achieve a larger number of N. For example, five 1×4 fiber couplers can be arranged to achieve a 1×16 fiber coupler after secondary connection, and twenty-one 1×4 fiber couplers can be arranged to achieve a 1×64 fiber coupler after secondary connection.

Preferably, the optical fiber array component as stated can have N ports or M×N ports at the input ends of optical fibers, which can be connected with an optical switch with 1×N or M×N (among them, the M and N are integers) ports of the output end. Using an optical switch, one or M laser transmission beams can be switched swiftly to N or M×N ports, with a total output of N or M×N collimating beams, which will greatly reduce the number of lasers.

The collimating lens assembly can comprise at least one spherical or aspherical glass lens, which can achieve minimal aberration under different fields of view through optical design optimization. The laser spot after collimating has the characteristics of high beam quality, small wavefront distortion and small divergence angle of far-field, which can achieve accurate detection of distant targets.

Preferably, the collimating lens assembly can also be a cemented lens, such as doublet or triplet, containing two or more single lenses. By designing and selecting lens materials with different refractive index and Abbe number, the excellent optical collimating performance of the emerging light beam under different fields of view can be realized.

Furthermore, the surface of the lens is coated with an anti-reflection film having a wavelength range of 800 nm to 1600 nm, which can cover the emission wavelength of the LiDAR light source, thus reducing the reflection loss of the lens surface.

The housing is machined, 3D-printed, or molded. To facilitate assembly and adjustment, the housing can include a positioning step for the collimating lens and can include a positioning step for the optical fiber array. A positioning hole can be used on the side of the housing for placing the collimating lens component in the housing.

Preferably, the housing is usually made of aluminum, aluminum alloy, stainless steel, or other alloys.

Preferably, the surface of the housing is treated with blackening or anodic oxidation, which is not only beautiful, but also enhances the corrosion resistance of the housing surface, thus greatly improving the high reliability of long-term use of the collimator.

The assembly process of the disclosure is as follows: Firstly, the collimating lens components installed directly and fixed onto the corresponding positioning step in the housing, then the fiber array is roughly moved to the positioning steps (in order to facilitate adjustment, fiber array is tightly held by vacuum fixture with high precision, the fixture adjusted by high-precision five-dimensional device to realize the adjustment of the front and back, left and right sides and angles). Then fine-tune the distance and angle between the optical fiber array and the collimating lens, at the same time, through the wavefront sensor and beam profiler to real-time monitor the wavefront distortion of the collimating beam and the collimating dispersion angle, when the design parameters of the collimator is reached, stop adjusting, dispensing ultra-violet (UV) glue, the optical fiber array is fixed and complete the assembly of the collimator.

The assembly process of the disclosure is simple, and by the real-time online monitoring and feedback system, automatic adjustment and assembly can be realized, which is conducive to mass production in large quantities and low cost.

Compared with the prior art, the disclosure has the following beneficial effects:

Firstly, the disclosure adopts fiber array component and collimating lens, one optical fiber array collimator can transmit and realize N ($N \geq 2$, N can be as high as hundreds of) high quality collimating beams with different azimuth angle, which can replace traditional N sets of collimators, when N is bigger, it will greatly reduce the cost of LiDAR collimator and reduce its volume.

Secondly, the optical fiber array of the disclosure can be processed according to the design requirements, including uneven distribution of density, which fully meets the differentiated requirements of collimating beam spacing density at different azimuth angles, and then realizes the differentiation requirements of detection accuracy at different azimuth angles.

Thirdly, the optical fiber of the disclosure is very thin, and the minimum spacing of the optical fiber can reach 0.25 mm or less, and the corresponding optical fiber arrangement can reach a very high density. The higher the density of the collimating beam is, the higher the spatial resolution of the LiDAR detection is.

Fourthly, the optical fiber array component as stated, its N ports or M×N ports at the input end of optical fiber can be connected with an optical fiber coupler or fiber splitter with 1×N or M×N (among them, the M and N are integers) ports of the output end, through the optical fiber coupler or splitter, which can realize one or M high power laser transmission power being divided into 1/N, with a total output of N or M×N collimating beams, which will greatly reduce the number of lasers.

Fifthly, the optical fiber array component as stated, its N ports or M×N ports at the input end of optical fiber can be connected with an optical switch with 1×N or M×N (among them, the M and N are integers) ports of the output end, through the optical switch, which can realize one or M laser transmission beam being switched swiftly to N or M×N ports, with a total output of N or M×N collimating beams, which will greatly reduce the number of lasers.

Sixthly, the optical fiber array assembly of the disclosure can superimpose L 1×N optical fiber arrays together (where L and N are integers) to form an L×N two-dimensional optical fiber array, or an integrated L×N two-dimensional optical fiber array. After the two-dimensional optical fiber array passes through the collimating lens, L×N collimating beams can be formed. Distributed in horizontal and vertical directions and with different azimuth angles, 3D detection can be realized without mechanical scanning or other scanning methods, thus reducing the overall cost of the LiDAR system.

Seventhly, the collimating lens adopted by the disclosure, by optimizing the optical design, having the characteristics of big clear aperture and small aberration, which can well collimate the N ports of output beams from different field of view (FOV) of the fiber array. The collimating beams have high beam quality, small wavefront aberration and small far-field divergence angle, which can meet the high precision of long-range target detection.

Eighthly, the assembly process of the disclosure is simple, and through the real-time online monitoring and feedback system, automatic adjustment and assembly can be realized, which is conducive to large quantities and low-cost mass production.

The foregoing summary is not intended to summarize each potential embodiment or every aspect of the present disclosure.

BRIEF DESCRIPTIONS OF THE DRAWINGS

DETAILED DESCRIPTION

To make the purpose, technical scheme, and advantages of the disclosure clearer, the following is a further detailed description of the disclosure combined with the attached drawings and practical examples. It should be understood that the specific embodiments described herein are intended only to explain and not to qualify the disclosure.

A. Embodiment 1

Figure 1A:
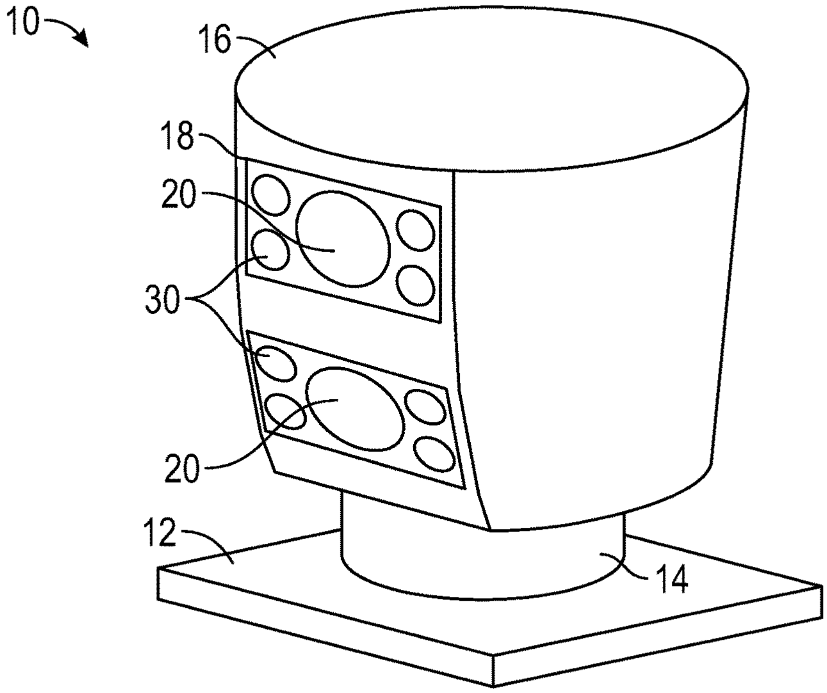
FIGS. 1A-1B illustrates a schematic of a multi-line LiDAR system.
Figure 1B:
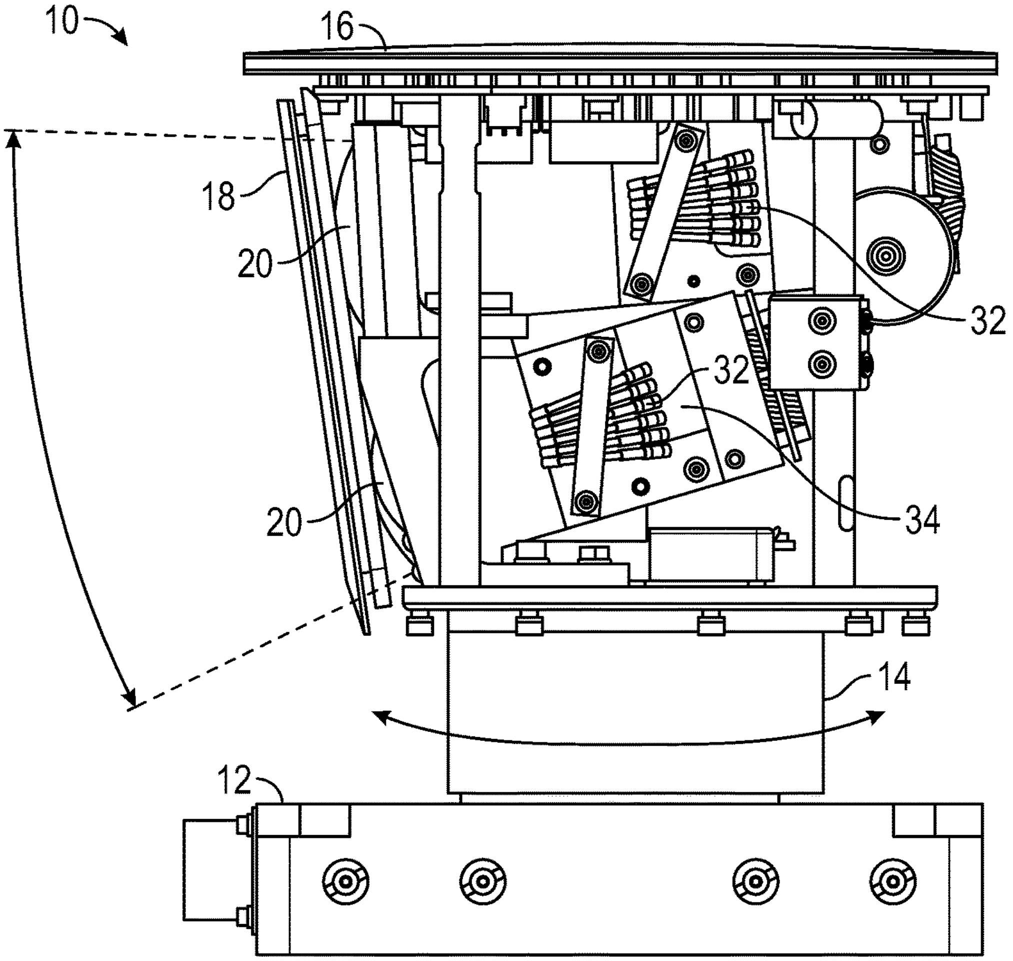
Figure 2A:
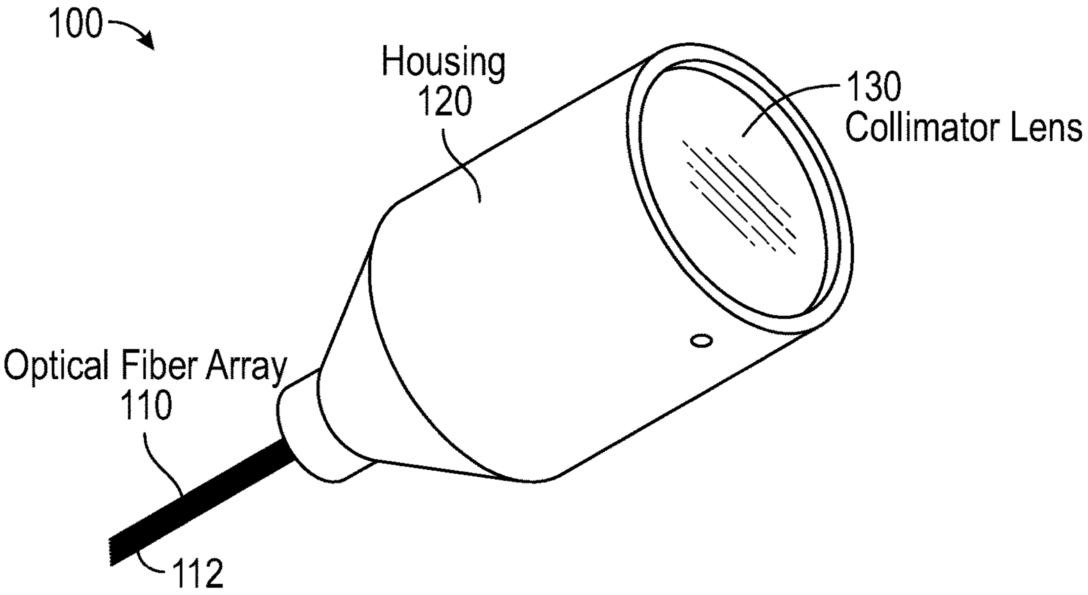
FIG. 2A illustrates a perspective view of an optical fiber array collimator in accordance with a first embodiment of the disclosure.
Figure 2B:
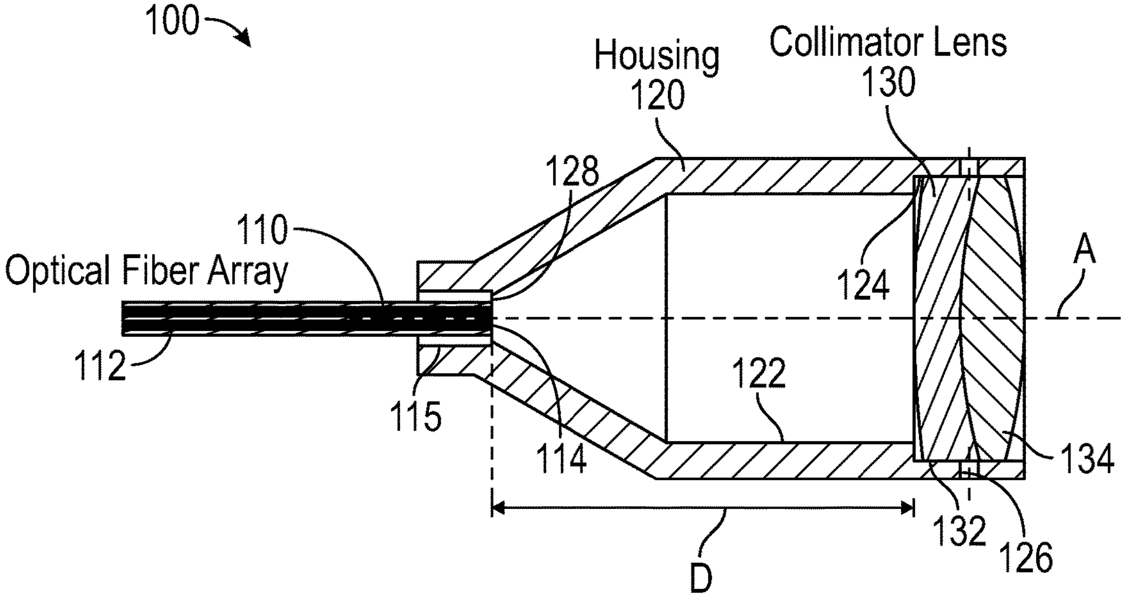
FIG. 2B illustrates a cross-sectional view of the optical fiber array collimator.

FIG. 2A illustrates a perspective view of an optical fiber array collimator 100 in accordance with a first embodiment of the disclosure, and FIG. 2B illustrates a cross-sectional view of the optical fiber array collimator 100. The collimator 100 can be used in a multi-line LiDAR system, such as discussed previously, and the collimator can replace the vertically-arranged arrays 34 for the transmitters of the system.

The collimator 100 in this implementation example includes a 1×8 one-dimensional fiber array 110. Here, the array 110 has 8 single-mode fibers 112 that are evenly spaced with respect to each other. For example, the pitch between the fibers 112 in the array 110 can be 0.5 mm, and the pitch accuracy can be around 0.5 μm. The output end 116 of optical fiber array 110 is ground and polished with an 8 degree angle, and the end face 114 is coated with an anti-reflection film.

As shown in FIGS. 2A-2B, a collimating lens component 130 of the collimator 100 is disposed on one side of a housing 120 opposite to the end face 114 of the fiber array 110 centered on the other side of the housing 120. The light output surface of the optical fiber array 110 is installed near a focal plane of the collimating lens component 130.

The collimating lens component 130 can be a doublet lens having two lenses 132, 134, as shown in FIG. 2B. Through design optimization, two kinds of glass materials for the doublet lenses 132, 134 with different refractive index values and Abbe numbers are selected to achieve good optical design performance. At the same time, the glass material for the doublet lenses 132, 134 also needs to have the advantages of stable properties, easy processing, and low price. Anti-reflection films can be coated on the incident and exit surfaces of the lenses 132, 134. Depending on the implementation details, the effective aperture can be 32 mm, and the focal length F of the lens 130 can be 100 mm.

As disclosed herein, the collimating lens component 130 can include at least one spherical lens or aspherical glass lens, which can achieve minimal aberration under different fields of view through optical design optimization. The laser spot after collimating preferably has the characteristics of high beam quality, small wavefront distortion and small divergence angle of far field, which can achieve accurate detection of distant targets.

The collimating lens component 130 can also be a cemented lens component, such as doublet or triplet, containing two or more single lenses 132, 134. By designing and selecting lens materials with different refractive index values and Abbe numbers, desired optical collimating performance of the emerging light beam under different fields of view can be realized.

Furthermore, the surface of the lens component 130 may be coated with an anti-reflection film having a wavelength range of 800 nm to 1600 nm, which can cover the emission wavelength of a LiDAR light source, thus reducing the reflection loss of the lens surface.

The housing 120 can be machined, 3D-printed, or molded. Additionally, the housing 120 can be made of aluminum, aluminum alloy, stainless steel, or other alloys. In one embodiment, the material for the collimator housing 120 can be aluminum 6061 made by mechanical processing. Preferably, the inner surfaces 122 of the collimator housing 120 are sandblasted and given blackening or anodic oxidation treatment for good corrosion resistance and reliability. A positioning step 124 inside the inner surface 122 and holes 126 in the side can be used to position and fix the lens component 130 in the collimator housing 120. Additionally, a positioning step 128 inside the inner surface 122 can be used to position and fix the optical fiber array 110 in the housing 120.

In this implementation example, the light output surface of 1×8 one-dimensional fiber array 110 is installed near the focal plane of the collimating lens component 130, which belongs to the telecentric optical path of the image side. By adjusting the distance (D in FIG. 2B) between the fiber array 110 and the collimating lens 130, high precision collimation of the output beams of the eight fibers 112 can be realized simultaneously. Due to the large focal length and aperture of the collimating lens component 130, the divergence angle of the collimated beams can be very small.

For example, for the wavelength of 1550 nm, the mode field diameter of a single-mode fiber 112 may be 10.4 microns. The focal length F can be 100 mm, and the effective aperture of the lens component 130 can be 30 mm. According to the Gaussian beam transmission formula, the beam waist diameter after collimation can reach 19 mm, the corresponding far-field divergence angle is only about 0.05 mrad (about 0.003 degrees), and the Rayleigh distance of the beam is up to 182 meters.

Figure 3A:
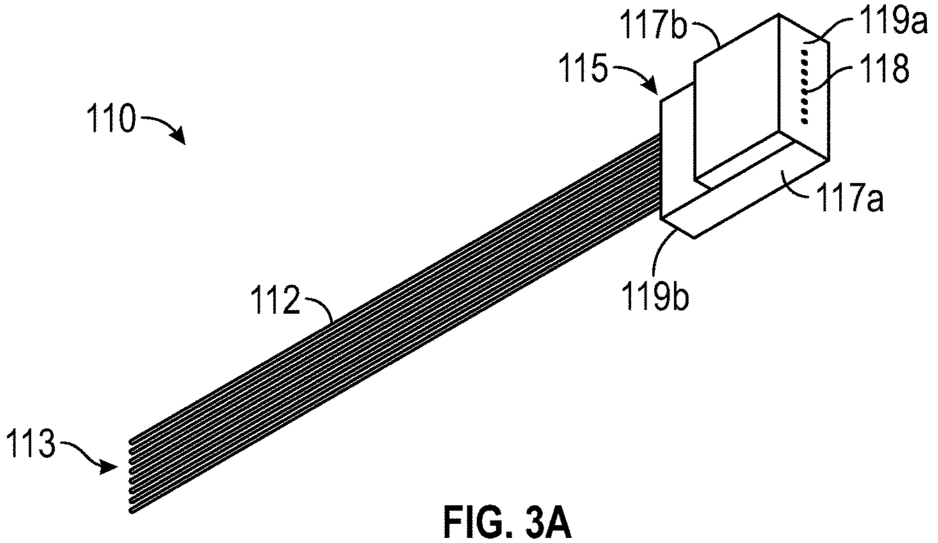
FIG. 3A illustrates a perspective view of a 1×8 optical fiber array (having equal spacing of optical fibers) for the optical fiber array collimator.
Figure 3B:
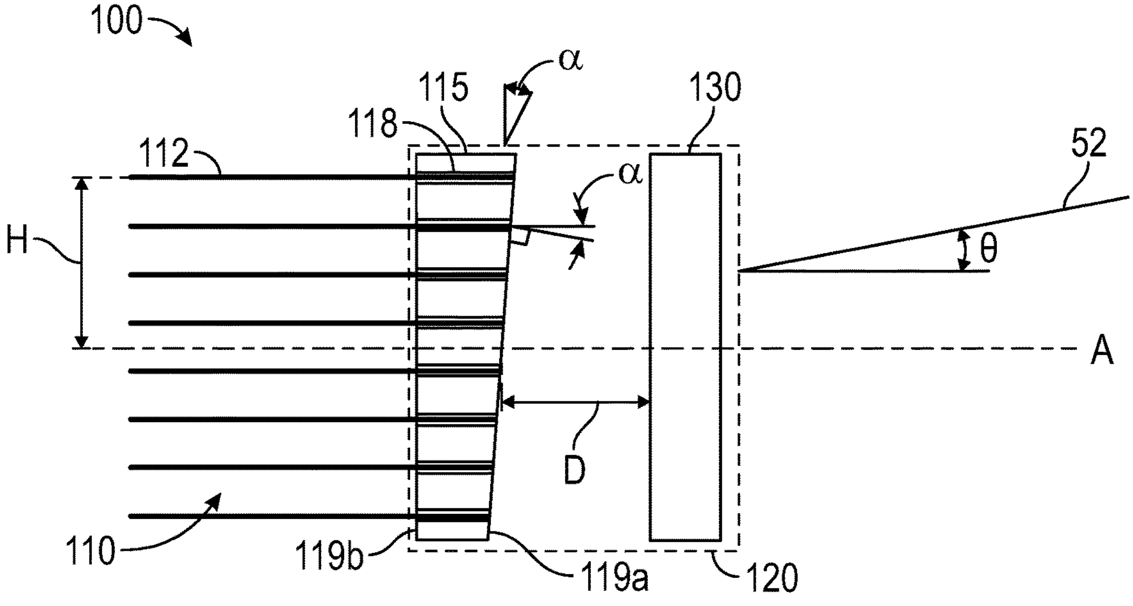
FIG. 3B illustrates a schematic diagram of the optical fiber array collimator having the 1×8 optical fiber array.

FIG. 3A illustrates one example of 1×8 optical fiber array 110 having fibers 112 and an end connector 115 for use in the collimator 100 of FIGS. 2A-2B, and FIG. 3B illustrates a schematic diagram of the optical fiber array collimator 100 having the 1×8 optical fiber array 110.

The optical fiber array 110 includes optical fibers 112 connected to an end connector 115. The end connector 115 can have a base component 117*a* with V-groove slots 118 for the fiber tips and can have an upper cover plate 117*b*. The material of the base component 117*a* can be glass, Si, ceramic, etc., and the V-groove slots 118 can be processed by high-speed blade dicing of a slicing machine or by an etching process. The pitch of the V-groove slots 118 in the base component 117*a* can have an accuracy of 0.5 micron, and the V-groove spacing can be unevenly or evenly distributed according to the design requirements.

The optical fibers 112 can be single-mode or multi-mode optical fibers, and the number of optical fibers 112 can be greater than two and up to hundreds. The material for the cover plate 117*b* can be glass or ceramic. During assembly, the optical fibers 112 are placed in the V-groove slots 118 of the base component 117*a*, and the upper cover 117*b* is pressed on the optical fibers 112 and is fixed. The middle area is filled with highly-reliable glue. After the glue is cured, the end face 119*a* of the connector 115 is ground and polished.

In the assembly of the optical fiber array 110, the spacing between each fiber 112 can have an uneven distribution or can have uniform distribution according to the design requirements. For example, the distance between the optical fiber cores can range from 0.2 mm to dozens of millimeters, and the accuracy for the spacing between the fiber cores can be up to 0.75 microns or less.

Preferably, in the assembly, the end face 119*a* is angled and is not just orthogonal to the axis A of the fibers 112 in the V-groove slots 118. In particular, the end face 119*a* can be set at an offset angle α from orthogonal. Consequently, the optical fiber holes produced by the V-groove slots 118 for the optical fibers 112 are defined at an angle α relative to the the normal of the end face 119*a*. This angle α can range from 4 degrees to 20 degrees. This angling can greatly improve the RL (Return Loss) specifications of the collimator 100 and can reduce the interference of the return light to the laser. Preferably, in assembling the optical fiber array 110, the polished face can be coated with anti-reflection film having a wavelength range of 800 nm to 1600 nm to cover the LiDAR light source emission wavelength, which can reduce the reflection loss of the optical fiber ends. Input ends (113) of the fibers 112 in the optical fiber array 110 can use standard connectors, including but not limited to LC, SC, FC, ST, and other industry-standard connectors.

Figure 3C:
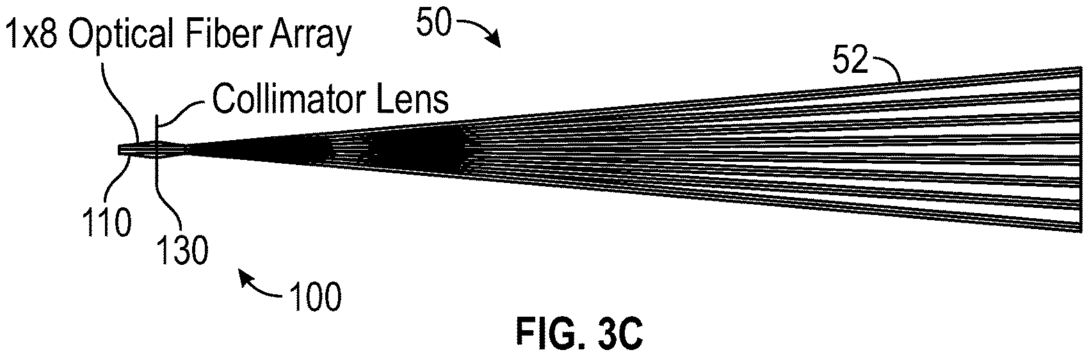
FIG. 3C illustrates a schematic diagram of collimated beams for the optical fiber array collimator.

FIG. 3C shows a schematic diagram of an optical path 50 for collimated beams 52 from the disclosed collimator 100. Eight collimated beams 52 are shown being transmitted from the fiber array 110 and collimating lens component 130 of the disclosed collimator 100.

Good beam collimation greatly improves the ability of a LiDAR system to detect distant targets. The collimated beams 52 output by the optical fibers 112 deviate from the main optical axis A of the collimating lens component 130 at different heights H in the optical fiber array 110. Therefore, the collimated beams 52 have different exit field angles θ. The field angles θ can be calculated according to the formula 0=Arctan (H/F), where H is the height of the optical fiber 112 deviating from the main optical axis (A), and F is the effective focal length of the collimating lens component 130. In one configuration, the maximum fiber height H can be 1.75 mm, the focal length F can be 100 mm, the maximum vertical field angle can be about +/−1 degree, and the resolution can be about 0.25 degree.

Figure 4A:
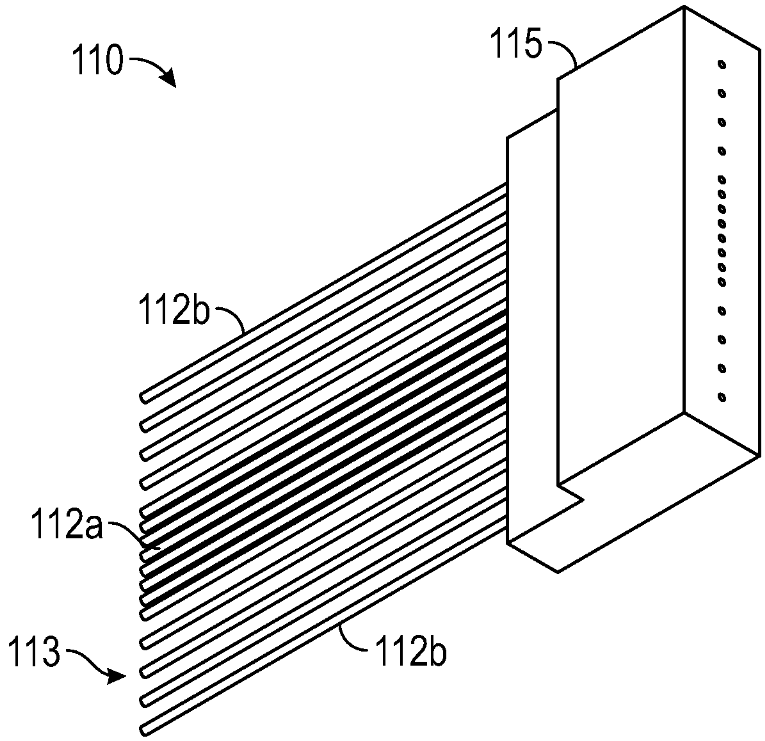
FIG. 4A illustrates a perspective view of a 1×16 optical fiber array (having non-uniformly distributed optical fiber spacing) for the optical fiber array collimator.
Figure 4B:
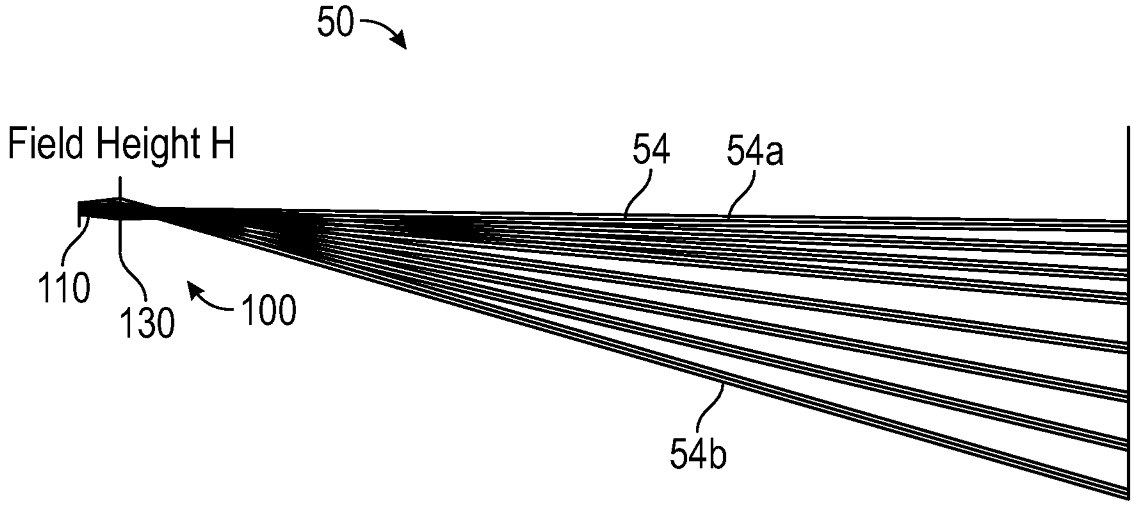
FIG. 4B illustrates a schematic diagram of collimated beams of the optical fiber array when the distance between the optical fibers is not evenly distributed.

As shown in FIGS. 4A-4B, the field angle range and resolution of collimated beams 52 in the vertical direction can be satisfied by adjusting the number, spacing, and density distribution of the optical fibers 112 in the optical array 110. For example, the number of optical fibers 112 can be increased to 16. In this example shown in FIG. 4A, the spacing of a middle eight fibers 112*a* can still be set at 0.5 mm, but the spacing of the eight edge fibers 112*b* can be increased to 1 mm. At this point, the maximum fiber height H can be 5.75 mm, the focal length F can be 100 mm, the maximum vertical field angle can be about +/−3.3 degrees, and the angular resolution can be about 0.25 degrees in the range of +/−1 degree field angle, but only about 0.575 degrees in the range of −3.3 degrees~−1 degree and 1 degree~3.3 degree.

FIG. 4B shows an optical path 50 of eight collimated beams 54 on the side of the fiber height H equal to 0 to 5.75 mm. The first four collimated beams 54*a* (from four of the middle fibers 112*a*) have fiber heights H of 0.25, 0.75. 1.25. and 1.75 mm, and the second four collimated beams 54*b* (from four of the edge fibers 112*b*) have fiber heights H of 2.75, 3.75. 4.75. and 5.75 mm.

For this embodiment, during the assembly, the collimating lens component 130 is installed directly and fixed onto the corresponding positioning step 124 in the housing 120. The fiber array 110 is roughly moved to the positioning steps 128. The fiber array 110 can be tightly held by a vacuum fixture with high precision, and the fixture can be adjusted by high-precision five-dimensional device to realize the adjustment of the front and back, left, and right sides and angles.

Then, a calibration process fine-tunes the distance and angle between the optical fiber array 110 and the collimating lens component 130 at the same time. For example, a wavefront sensor and beam profiler (not shown) can be used to monitor wavefront distortion of the collimated beam and the collimated dispersion angle in real-time as the distance and angle are adjusted between the optical fiber array 110 and the lens component 130. When the design parameters of the collimator 100 are reached, the calibration process stops adjusting the distance and angle, and an ultra-violet (UV) glue is dispensed so that the optical fiber array 110 is fixed in the housing 120. The assembly process is simple, and by using real-time online monitoring and feedback, automatic adjustment and assembly can be realized, which is conducive to large volume and low-cost mass production.

B. Embodiment 2

Figure 5:
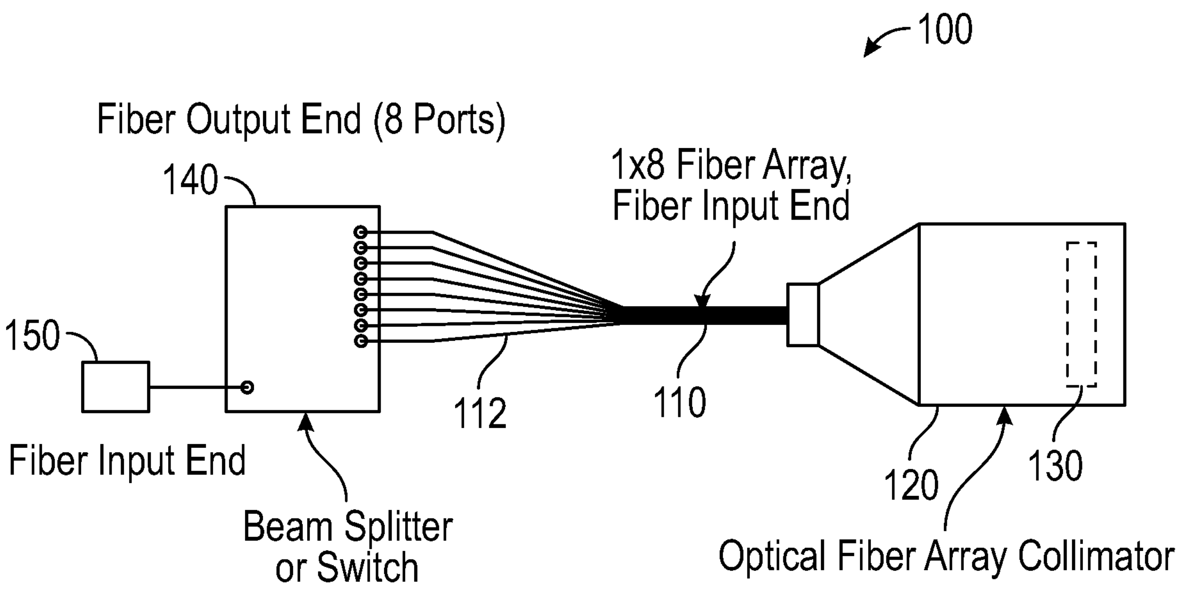
FIG. 5 illustrates a schematic diagram of a second embodiment of the disclosure.

FIG. 5 shows a second embodiment of the present disclosure. Here, the input end of a collimator 100 having a collimator housing 120, a collimating lens component 130, and an 8-channel optical fiber array 110 is connected with the output end of a coupling component 140. For its part, the coupling component 140 can be an optical fiber coupler, splitter, or switch 140 having at least one input port at an input end and having a plurality (eight) of output ports at an output end. At least one laser source 150 is connected to the at least one input port.

In one arrangement, at least one optical signal at the fiber input end of the optical fiber splitter 140 can be divided into a plurality of beams at the output ports of the output end, can pass along the fibers 112 of the optical fiber array 110, to the collimator housing 120 having the collimating lens component 130. High-precision collimation can then be realized through the optical fiber array collimator 100. In this way, a laser source 150 connected to the at least one input port is configured to output laser transmission power. The optical fiber coupler or splitter 140 divides the laser transmission power of the laser source 150 to the plurality of output ports.

As noted above, the coupling component 140 can be fiber couplers, fiber beam splitters, or optical switches. For an optical fiber splitter 140, the fiber array 110 can be connected by optical fiber fusion or standard connectors, such as FC/APC or LC, to the splitter 140.

In one embodiment, the laser source 150 is a high-power laser connected to the coupling component 140. Laser transmission power from the high-power laser 150 can be divided into about ⅛ of the transmission power, and eight collimated beams can be transmitted, which will greatly save the number of lasers, reduce the cost, and also reduce the volume of the device.

It is easy to understand that this implementation example can be extended to M input terminals and M×N output terminals (where M and N are integers) can achieve M laser inputs and M×N collimating beam output. For example, the coupling component 140 can include a 1×N fiber coupler having one fiber input and having N fiber outputs, which cascade through a number of additional fiber couplers or fiber splitters to achieve a larger number of N beams for the optical fiber array 110. For example, five 1×4 fiber couplers can be arranged to achieve a 1×16 fiber coupler after secondary connections, and twenty-one 1×4 fiber couplers can be arranged to achieve a 1×64 fiber coupler after secondary connection.

In another embodiment, the coupling component 140 can be an optical switch, and the laser source 150 can be a high-power laser connected to the optical switch 140. During operation, switching of the optical switch 140 can be quickly controlled. (In fact, response time of the optical switch 140 can reach sub-microsecond level.) In this way, the laser source 150 can emit eight collimated beams between different channels in time sequence, which greatly saves the number of lasers, reduces the cost, and reduces the volume of the device.

C. Embodiment 3

Figure 6:
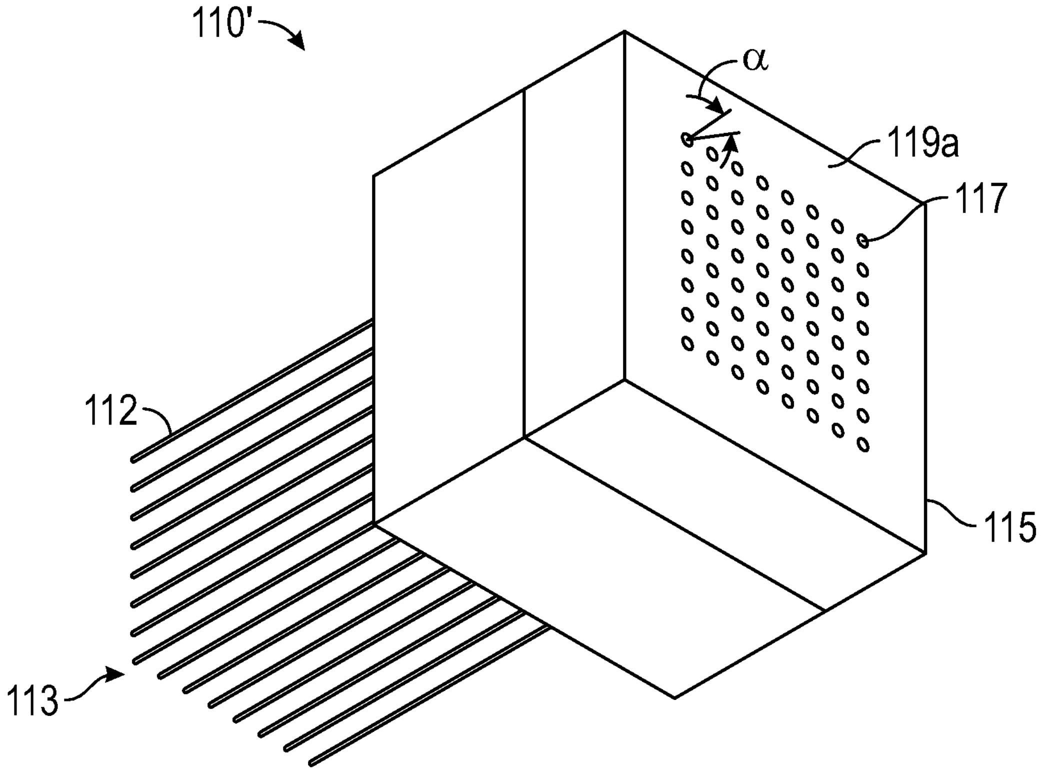
FIG. 6 illustrates a schematic diagram of an integrated two-dimensional optical fiber array according to a third embodiment of the disclosure.

In a third embodiment of the present disclosure, the 1×8 one-dimensional optical fiber array (110) in the first embodiment is replaced with an 8×8 integrated two-dimensional optical fiber array. FIG. 6 shows a schematic diagram of this two-dimensional optical fiber array 110' according to the third embodiment having optical fibers 112 and end connector 115.

For the integrated 2D optical fiber array 110', a lithography process can be used according to the requirements of design to etch an 8 by 8 array of fiber holes 117 in a Si plate of the end connector 115. The fiber hole size can be about 126-μm with round or multilateral shape. The fiber hole spacing accuracy can be as high as submicron. Preferably, a high-reliability thermal curing glue is used to fix the optical fibers 112 in the holes 117. The end connector 115 is ground and polished to polish the fiber end surfaces. After that, the end face is coated with anti-reflection film, which can cover the emission wavelength of a LiDAR light source to reduce the reflection loss of fiber end faces. To improve the return loss, the optical fiber holes 117 of the two-dimensional optical fiber array 110' can be processed at a certain angle α in the depth direction relative to the end face 119*a*. Stated differently, the end face 119*a* is angled and is not just orthogonal to the axis A of the fibers 112 in the holes 117. In particular, the end face 119*a* can be set at an offset angle α from orthogonal. Consequently, the optical fiber holes 117 for the optical fibers 112 are defined at an angle α relative to the normal of the end face 119*a*. This angle α can range from 4 degrees to 20 degrees.

It is not difficult to understand that the integrated optical fiber array 110' in this example can also be realized by stacking eight pieces of 1×8 one-dimensional optical fiber arrays together.

In this example, after the emitting light from 2D fiber array 110' passes through the collimating lens component (130) of a collimator (100), a plurality of collimated beams (8×8=64) are formed. Similar to the collimated beams discussed with reference to FIGS. 3C and 4B, the collimated beams from the collimator (100) having this array 110' are distributed in horizontal, but also in vertical directions and have different azimuth angles. In this way, three-dimensional detection can be realized without mechanical scanning or other scanning methods, thus reducing the overall cost of the LiDAR system.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A collimator assembly for producing a plurality of laser beams, the collimator assembly comprising:

a housing having an input and an output;

an optical fiber array having a plurality of optical fibers, the plurality of optical fibers having fiber ends and being configured to emit the laser beams from the fiber ends;

a connector, disposed in the input of the housing, configured to arrange the fiber ends of the plurality of optical fibers in an array, the connector having an end face disposed at an acute angle relative to the fiber ends; and a collimating lens component disposed in the output of the housing and having a focal plane near an output surface of the laser beams from the optical fiber array.

2. The collimator assembly of claim 1, wherein the connector comprises:

a base component having V-grooves with the fiber ends installed therein; and a cover plate affixed to the base component to cover the fiber ends.

3. The collimator assembly of claim 2, wherein a pitch between the V-grooves has an accuracy of 0.5 microns, and wherein spacings between the V-grooves are unevenly or evenly distributed.

4. The collimator assembly of claim 1, wherein the plurality of optical fibers are single-mode or multi-mode optical fibers.

5. The collimator assembly of claim 1, wherein spacings between the plurality of optical fibers are unevenly distributed or evenly distributed in the optical fiber array, wherein a distance between cores of the plurality of optical fibers range from 0.2 mm to dozens of millimeters, and wherein an accuracy in the spacing is 0.75 micron or less.

6. The collimator assembly of claim 1, wherein the acute angle ranges from 4 degrees to 20 degrees.

7. The collimator assembly of claim 1, wherein the end face of the connector comprises a polished face coated with an anti-reflection film having a wavelength range of 800 nm to 1600 nm.

8. The collimator assembly of claim 1, wherein the collimating lens component comprises at least one spherical lens or aspherical glass lens.

9. The collimator assembly of claim 1, wherein the collimating lens component comprises a cemented lens component containing two or more lenses, and wherein materials of the two or more lenses have different refractive index values and Abbe numbers.

10. The collimator assembly of claim 1, wherein a surface of the collimating lens component is coated with an antireflection film having a wavelength range of 800 nm to 1600 nm.

11. The collimator assembly of claim 1, wherein the housing is composed of aluminum, aluminum alloy, stainless steel, or other alloy.

12. The collimator assembly of claim 1, wherein a surface of the housing is treated with blackening or anodic oxidation.

13. The collimator assembly of claim 1, wherein the optical fiber array comprises a plurality (L) of (1×N) optical fiber array elements superimposed together and forming a two-dimensional optical fiber array of L×N.

14. The collimator assembly of claim 1, wherein the optical fiber array comprises an integrated L×N two-dimensional fiber array assembly.

15. The collimator assembly of claim 1, comprising an optical fiber coupler or fiber splitter having at least one input port and having a plurality of output ports, wherein the output ports are connected to the plurality of optical fibers of the optical fiber array.

16. The collimator assembly of claim 15, comprising a laser source connected to the at least one input port and configured to output laser transmission power, wherein the optical fiber coupler or the fiber splitter divides the laser transmission power of the laser source to the plurality of output ports.

17. The collimator assembly of claim 15, wherein the optical fiber coupler or the fiber splitter comprises a 1×N fiber coupler having one input end and having N outputs, and wherein the N outputs are cascaded through a number of fiber couplers or fiber splitters.

18. The collimator assembly of claim 15, comprising an optical switch having at least one input port and having a plurality of output ports, wherein the at least one input port is configured to receive laser transmission power, wherein the plurality of output ports is connected to the plurality of optical fibers of the optical fiber array, and wherein the optical switch is configured to switch the laser transmission power from the at least one input port between the plurality of output ports.

19. A collimator and Light Detection and Ranging (LiDAR) system, comprising:

a plurality of transmitters configured to transmit a plurality of optical beams, each of the plurality of transmitters comprising:

a housing having an input and an output;

an optical fiber array comprising a plurality of optical fibers, each optical fiber configured to emit one of the plurality of optical beams via a fiber end;

a collimating lens component, disposed in the output of the housing, configured to collimate each of the optical beams emitted by the optical fiber array; and a connector, disposed in the input of the housing, configured to position each fiber end relative to an optical axis of the collimating lens component such that each optical beam emitted by the optical fiber array is transmitted at a distinct emergence angle; and a plurality of receivers being configured to receive reflected returns from the plurality of optical beams.

20. A method of assembling a collimator assembly for use with a Light Detection and Ranging (LiDAR) system, the method comprising:

attaching fiber ends of a plurality of optical fibers in an optical fiber array to a connector having an end face disposed at an acute angle relative to the fiber ends;

installing a collimating lens component into an output end of a housing;

locating the connector of the optical fiber array in an input end of the housing;

fine-tuning a distance and an angle between the fiber ends and the collimating lens component by monitoring wavefront distortion and dispersion angle of a collimated beam while adjusting the optical fiber array relative to the collimating lens component; and affixing the connector of the optical fiber array to the input end at the fine-tuned distance and angle.

21. The method of claim 20, wherein locating the connector and adjusting the optical fiber array comprise holding the optical fiber array by a vacuum fixture on a high-precision five-dimensional device.

22. The method of claim 20, wherein fine-tuning the distance and the angle comprises fine-tuning the distance and the angle at a same time using a wavefront sensor and a beam profiler to monitor the wavefront distortion and the dispersion angle.

23. The method of claim 20, wherein affixing the connector of the optical fiber array to the input end comprises using an ultra-violet (UV) glue.

24. The method of claim 20, wherein attaching the connector to the fiber ends of the plurality of optical fibers in the optical fiber array comprises:

forming a series of through-holes with sub-micron size and spacing in a glass plate or Si plate using a lithography process;

affixing the fiber ends in the through-holes;

grinding and polishing end faces of the fiber ends; and coating the end faces with an anti-reflection film having a wavelength range of 800 nm to 1600 nm covering an emission wavelength of the LiDAR system.

25. The method of claim 20, wherein attaching the connector to the fiber ends of the plurality of optical fibers in the optical fiber array comprises:

placing the fiber ends in V-grooves defined in a base component;

affixing a cover on the base component over the fiber ends; and grinding and polishing end faces of the fiber ends.

26. The method of claim 20, wherein installing the collimating lens component into the output end of the housing comprises engaging the collimating lens component against a positioning step defined in the output end of the housing.

27. The method of claim 20, wherein locating the connector of the optical fiber array in the input end of the housing comprises engaging the connector against a positioning step defined in the output end of the housing.

* * * * *